(12) United States Patent
Sio

(10) Patent No.: US 8,581,930 B2
(45) Date of Patent: Nov. 12, 2013

(54) METHOD FOR AUTOMATICALLY PRODUCING VIDEO CARTOON WITH SUPERIMPOSED FACES FROM CARTOON TEMPLATE

(75) Inventor: Yoke Kuan Sio, Singapore (SG)

(73) Assignee: Gemini Info Pte Ltd (SG)

( * ) Notice: Subject to any disclaimer, the term of this patent is extended or adjusted under 35 U.S.C. 154(b) by 686 days.

(21) Appl. No.: 12/745,897

(22) PCT Filed: Aug. 6, 2008

(86) PCT No.: PCT/SG2008/000288
§ 371 (c)(1),
(2), (4) Date: Jun. 3, 2010

(87) PCT Pub. No.: WO2009/072986
PCT Pub. Date: Jun. 11, 2009

(65) Prior Publication Data
US 2010/0245382 A1 Sep. 30, 2010

(30) Foreign Application Priority Data

Dec. 5, 2007 (SG) .............................. 200718347-8

(51) Int. Cl.
*G09G 5/02* (2006.01)
*G09G 5/14* (2006.01)

(52) U.S. Cl.
CPC ....................................... G09G 5/14 (2013.01)
USPC ........... 345/629; 345/619; 345/419; 345/581; 345/473; 345/660; 345/626; 345/636

(58) Field of Classification Search
CPC .............. G09G 5/14; G09G 2340/125; G09G 2340/10; G09G 2340/12
USPC .......... 345/619, 419, 581, 473, 660, 626, 636
See application file for complete search history.

(56) References Cited

U.S. PATENT DOCUMENTS

| | | | |
|---|---|---|---|
| 5,754,186 A * | 5/1998 | Tam et al. ..................... | 345/629 |
| 6,035,060 A * | 3/2000 | Chen et al. .................... | 382/164 |
| 6,283,858 B1 * | 9/2001 | Hayes et al. ................... | 463/31 |
| 6,400,374 B2 * | 6/2002 | Lanier ............................ | 345/630 |
| 6,570,579 B1 * | 5/2003 | MacInnis et al. ............. | 345/629 |
| RE42,205 E * | 3/2011 | Jung et al. ..................... | 382/103 |

(Continued)

FOREIGN PATENT DOCUMENTS

KR 20030096983 A 1/2003

*Primary Examiner* — Javid A Amini
(74) *Attorney, Agent, or Firm* — Horizon IP Pte. Ltd.

(57) ABSTRACT

A method for automatically producing video cartoons with user-provided faces superimposed on cartoon characters is presented. A cartoon template stores the original video cartoon with unanimously-colored backgrounds and original cartoon characters' faces drawn following the guidelines of the invention. A background detection algorithm is used to detect the unanimously-colored backgrounds, while a face detection algorithm is used to detect the facial colors, facial expressions, sizes, rotations, positions and clippings of the original cartoon characters' faces. The detected unanimously-colored backgrounds may be replaced by optional user-provided backgrounds. User-provided faces with the best matching user-specified facial colors and expressions are superimposed over and on top of the corresponding original faces of the cartoon characters at the detected sizes, rotations, positions and clippings to produce the final video cartoon. The cartoon template can be distributed to many different users. Different users can add different user-provided faces, background images and audio to the same cartoon template to produce many different final video cartoons.

17 Claims, 10 Drawing Sheets

(56) References Cited

U.S. PATENT DOCUMENTS

| | | |
|---|---|---|
| 2002/0051119 A1* | 5/2002 | Sherman et al. .................. 352/1 |
| 2003/0007700 A1* | 1/2003 | Gutta et al. .................. 382/282 |
| 2003/0020718 A1* | 1/2003 | Marshall et al. .............. 345/474 |
| 2003/0063781 A1* | 4/2003 | Philomin et al. .............. 382/118 |
| 2003/0063796 A1* | 4/2003 | Gutta et al. ................... 382/159 |
| 2003/0228135 A1* | 12/2003 | Illsley ............................. 386/52 |
| 2007/0286490 A1* | 12/2007 | Danowitz ...................... 382/195 |
| 2008/0294633 A1* | 11/2008 | Kender et al. ..................... 707/5 |
| 2008/0316328 A1* | 12/2008 | Steinberg et al. .......... 348/222.1 |

* cited by examiner

Long rectangular eyes are closed

Round or non-rectangular eyes are open

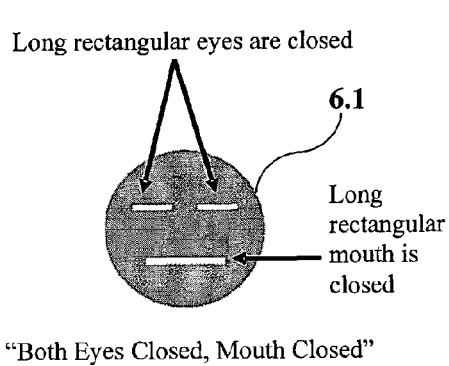

6.1

Long rectangular mouth is closed

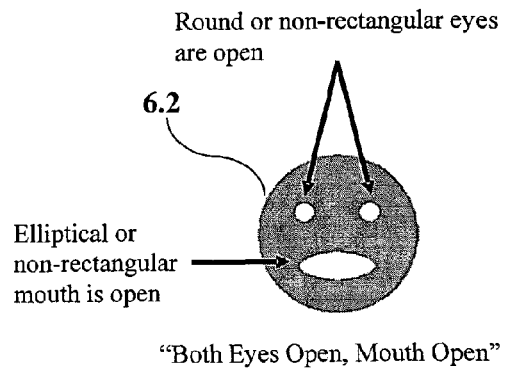

6.2

Elliptical or non-rectangular mouth is open

"Both Eyes Closed, Mouth Closed"

"Both Eyes Open, Mouth Open"

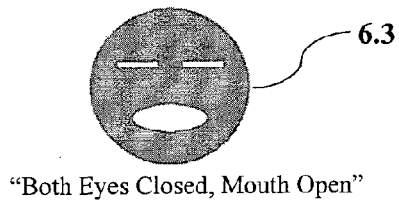

6.3

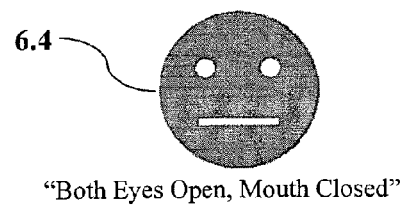

6.4

"Both Eyes Closed, Mouth Open"

"Both Eyes Open, Mouth Closed"

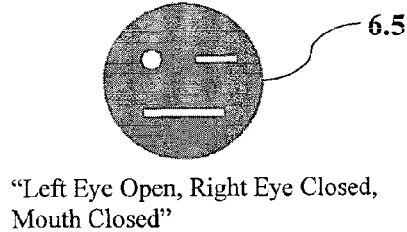

6.5

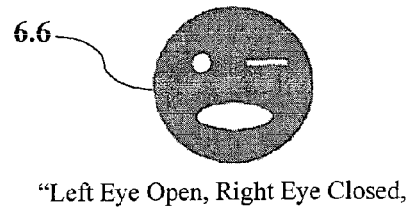

6.6

"Left Eye Open, Right Eye Closed, Mouth Closed"

"Left Eye Open, Right Eye Closed, Mouth Open"

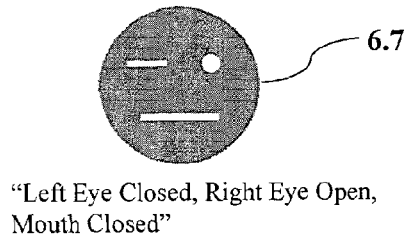

6.7

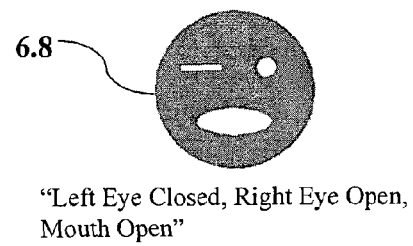

6.8

"Left Eye Closed, Right Eye Open, Mouth Closed"

"Left Eye Closed, Right Eye Open, Mouth Open"

FIGURE 6

METHOD FOR AUTOMATICALLY PRODUCING VIDEO CARTOON WITH SUPERIMPOSED FACES FROM CARTOON TEMPLATE

CROSS REFERENCES TO RELATED APPLICATIONS

This application is a National Stage Application of International Application No. PCT/SG2008/000288, filed on Aug. 6, 2008, which claims priority to Singapore Patent Application No. 200718347-8, filed on Dec. 5, 2007 of which its certified copy has been submitted to the International Bureau during the PCT stage. These applications are hereby incorporated by reference in its entireties.

FIELD OF THE INVENTION

The invention relates to automatic video production. In particular, the invention is a method for automatically producing video cartoon with user-provided faces superimposed on a distributable video sequence of cartoon characters.

BACKGROUND OF THE INVENTION

A video cartoon consists of a sequence of image frames to be played one after another. A cartoon character refers to the image drawn to resemble human, animal or other object within an image frame of the video cartoon. Photographic or drawn face of human or other animal may be superimposed on each cartoon character. Each image frame with superimposed faces within a video cartoon is currently produced manually as follows:

1. The cartoon characters for the image frame have to be available first. They may be produced beforehand by any other methods.
2. Each face to be superimposed have to be selected from among all the available faces to be the correct face and to show the required facial expression of its corresponding cartoon character for the image frame.
3. Using an image editing computer software, each face to be superimposed has to be resized and rotated so as to fit its corresponding cartoon character for the image frame.
4. Using an image editing computer software, each face to be superimposed is clipped, positioned and pasted onto the corresponding cartoon character as its face, for the image frame.
5. The cartoon characters with the superimposed faces may then be superimposed onto an optional background image to produce the final image frame.

Using video editing computer software, all the image frames are then combined into the final video cartoon, optionally adding background audio. The manual production of video cartoons with superimposed faces is time consuming and tedious as explained as follows:

1. For each image frame of the video cartoon, the superimposed faces need to be manually selected, resized, rotated, clipped and positioned, so as to fit the corresponding cartoon characters. A background image may also need to be added. This process will generally takes 20 seconds or more for each image frame, even for a very experience and fast computer software user. Even if it takes only 20 seconds for each image frame, it will take 40 minutes (2400 seconds) to produce a one-minute (60 seconds) duration video cartoon with 120 frames at a frame rate of 2 frames per second.
2. If the superimposed faces have to be changed, the process has to be repeated for each affected image frame.

The invention aims to automate and speed up the production of video cartoons with superimposed faces, by using distributable video sequences of cartoon characters, drawn according to the guidelines of the invention. With the guidelines of the invention, the invention is able to detect and recognise the original faces of the cartoon characters with high accuracy, and superimpose the corresponding user-provided faces over them correctly. With the invention, different users can provide different user-provided faces and backgrounds to the same distributable video sequence of cartoon characters to produce many different final video cartoons easily and rapidly.

International Patent WO02052565 is another method for automatic video production. However, it is different from the invention as it uses "distributable styles" for editing user-provided videos automatically instead, and offers no specific provision to detect and recognise the faces within the videos.

International Patent WO96002898 is a method for drawing the mouth of a user-provided face automatically within a video, while China Patent CN1710613 is a method for drawing the facial expression of a user-provided face automatically within a video. Both methods are different from the invention as they focus on drawing the user-provided face according to audio inputs, and offer no specific provision to detect, recognise or replace the faces within a video.

Japan Patent JP2002008057 and US Patent 20030228135 are both methods for replacing a real human face within a video with a user-provided face automatically. The invention is different from them in the following ways:

1. The invention replaces one or more cartoon characters' faces, drawn according to the guidelines of the invention, while Japan Patent JP2002008057 and US Patent 20030228135 are designed to replace a single real human face.
2. The invention has high accuracy of detecting the cartoon characters' faces because the cartoon characters' faces are drawn according to the guidelines of the invention. Japan Patent JP2002008057 and US Patent 20030228135 do not have such a high accuracy because computerised detection of real human face is not perfect.
3. The invention recognises and replaces one or more cartoon characters' faces with their corresponding user-provided faces with high accuracy. Japan Patent JP2002008057 and US Patent 20030228135 focus on drawing the face of a single person with no provision for accurate face recognition.

OBJECT OF THE INVENTION

The objectives of the invention are as follows:

1. The invention aims to automate and speed up the production of video cartoons with user-provided faces superimposed on cartoon characters. The invention is to be significantly faster than the corresponding manual process. For example, to produce a one-minute duration video cartoon at 2 frames per second, the invention should take less than one minute when using personal computer commonly available in the current market, compared to the manual process which can take 40 minutes or more.
2. The invention aims to be repeatable for different user-provided faces and backgrounds. This allows the same video sequence of cartoon characters to be distributed to many different users. Different users can then provide different faces and backgrounds to the same video sequence of cartoon characters to produce many different final video cartoons. A new industry of producing and distributing video sequences of cartoon characters to different users may then be created.

SUMMARY OF THE INVENTION

In this document, a "cartoon template" shall refer to a video cartoon, containing a sequence of cartoon characters, which can be distributed to many different users. With the invention, different users can add different user-provided faces, background images and audio to the same cartoon template to produce many different final video cartoons automatically.

In this document, an "original face" shall refer to the face of a cartoon character within a cartoon template, which is to be superimposed and covered by a user-provided face.

In this document, a "superimposed face" shall refer to a user-provided face which superimposes and covers the original face of a cartoon character within a cartoon template.

Within the cartoon template, the background and the original faces of the cartoon characters are drawn according to the guidelines of the invention. The guidelines are designed to be natural and simple to follow. Being only guidelines, no addition cost nor effort will be incurred when the cartoon template is being distributed to different users.

According to the guidelines of the invention, the cartoon characters in each image frame of the cartoon template may be drawn completed with a background image. If not, the background must be a unanimous colour detectable by a background detection algorithm. Similarly, if a user-provided face has a background which is not to be superimposed onto the cartoon character, the background must also be a unanimous colour detectable by a background detection algorithm.

The guidelines of the invention allow the original faces of the cartoon characters, together with their facial colours, facial expressions, sizes, rotations, positions and clippings, to be very accurately and efficiently detected by a simple face detection algorithm.

The invention involves the detection of unanimously-coloured regions (backgrounds and original faces) within images. To ensure that these regions are truly unanimously-coloured, the invention can use any existing and known image filtering algorithms (example: Median Filtering and K-means algorithm) to filter away the noises and slight variations of colours, if any, within the seemingly unanimously-coloured regions of the images.

The invention can use any existing and known background detection algorithm to detect the unanimously-coloured backgrounds of images. The remaining region of an image not detected as the background is the detected foreground.

The invention can use any existing and known face detection algorithm to detect the original faces within the image frames of a cartoon template. However, since the original faces are drawn according to the guidelines of the invention, the invention uses a face detection algorithm specially-designed to detect the original faces. The specific face detection algorithm is significantly more accurate, faster and yet simpler than a general face detection algorithm. The face detection algorithm also detects the facial colours, facial expressions, sizes, rotations, positions and clippings of the original faces within the cartoon template.

For each user-provided face, the user will have to specify a facial colour and a facial expression for its corresponding original face. If not, default facial colour and expression are assigned. For each detected original face within an image frame of the cartoon template, the invention selects the user-provided face with the best matching user-specified facial colour and expression. The selected face is then resized, rotated and positioned according to the size, rotation and position of the detected original face. If there is any clipping of the detected original face by other foreground objects of the image frame, the resized, rotated and positioned selected face will be clipped accordingly as well. Similarly, any detected background of the resized, rotated and positioned selected face is also clipped away.

For each image frame of the cartoon template, a new corresponding image frame is constructed for the final video cartoon. The user-provided background image, if any, is resized to fit and fill the new image frame. The detected foreground of the image frame of the cartoon template, less the detected original faces, is pasted onto the new image frame, over and on top of the background image, if any. The selected, resized, rotated, positioned and clipped user-provided faces are then pasted onto the new image frame, at their respective positions, over and on top of the background and pasted detected foreground.

Each new image frame is then assembled in its original video sequence to produce the final video cartoon with superimposed faces. Optional user-provided audio, if any, may also be added to the final video cartoon.

BRIEF DESCRIPTION OF THE DRAWINGS

FIG. 6 shows examples of the various facial expressions of the original faces of the cartoon characters, drawn according to the guidelines of the invention.

DESCRIPTION OF THE PREFERRED EMBODIMENTS

The preferred embodiment of the invention will be discussed herein after in detail with reference to the accompanying drawings. While examples are provided, the invention is not intended to be limited to the preferred embodiment, but is to be accorded the widest scope consistent with the principles and features disclosed herein.

Figure 1:
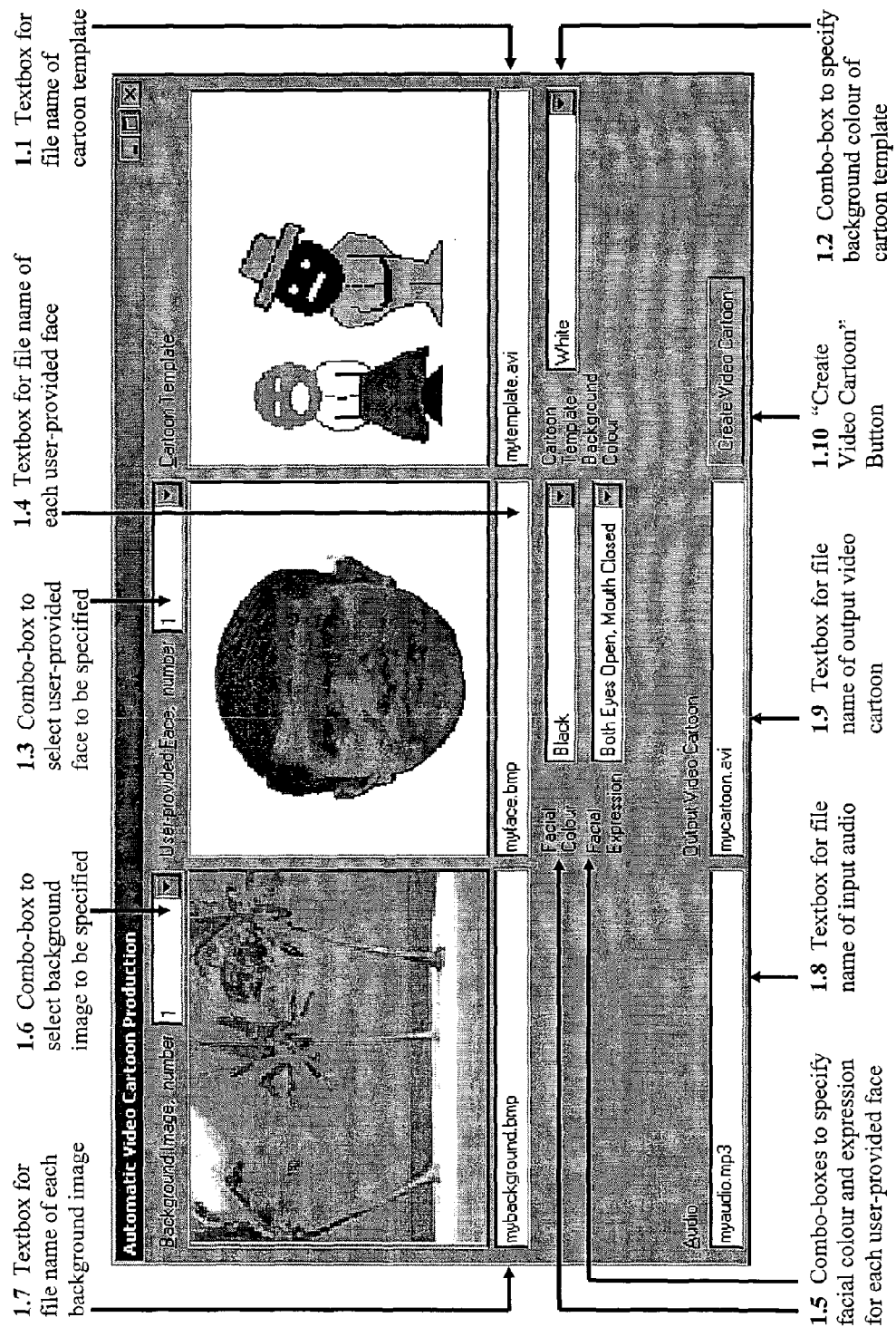
FIG. 1 shows an example of a graphical user-interface of a software program which is a preferred embodiment of the invention.

The preferred embodiment of the invention is a computer software program running on a computer with fast enough computation power. A commonly available personal computer in the current market is able to provide the required computation power. FIG. 1 shows an example of a graphical user-interface for the software program. The graphical user-interface allows a user to provide the following inputs:

1. Specify a cartoon template in the form of a video file (FIG. 1 Textbox 1.1).

2. Optionally specify the unanimous background colour for the cartoon template (FIG. 1 Combo-box 1.2).

3. Optionally supply one or more user-provided faces, where each face is in the form of an image file (FIG. 1 Combo-box 1.3 and Textbox 1.4).

4. For each user-provided face, optionally specify the facial colour and facial expression of its corresponding cartoon character's original face (FIG. 1 Combo-boxes 1.5). If not, a default facial colour or facial expression will be assigned.

5. Optionally provide one or more background image files (FIG. 1 Combo-box 1.6 and Textbox 1.7).

6. Optionally provide an audio file (FIG. 1 Textbox 1.8).

7. Specify the output video cartoon, in the form of a video file (FIG. 1 Textbox 1.9).

After the user has provided the inputs and clicked the "Create Video Cartoon" button (FIG. 1 Item 1.10), the software program will make use of the invention to automatically combine the user inputs into the final output video cartoon with superimposed faces. Referring to the overview of the invention shown in FIG. 2, the invention will automatically produce a video cartoon with superimposed faces from the following user input media:

1. A cartoon template in the form of a video.

2. One or more optional user-provided faces, where each face is in the form of an image.

3. One or more optional background images.

4. An optional audio.

Figure 2:
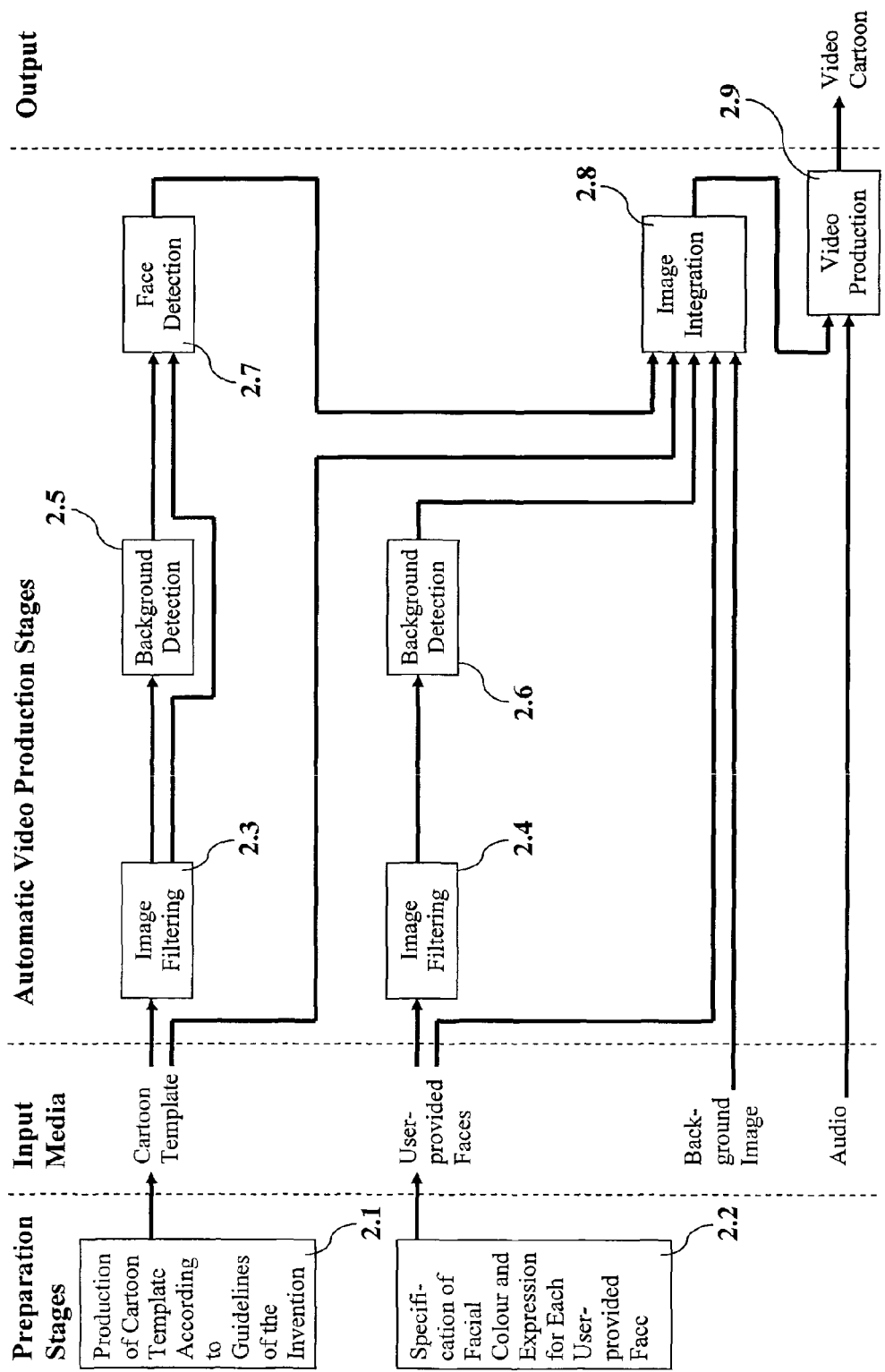
FIG. 2 shows the overview of the invention, with the inputs, the output and the various stages of the invention.

Referring to FIG. 2, the invention consists of the following stages:

1. Production of Cartoon Template According to Guidelines of the Invention (FIG. 2 Block 2.1)

2. Specification of Facial Colour and Expression for Each User-provided Face (FIG. 2 Block 2.2)

3. Image Filtering (FIG. 2 Block 2.3 and 2.4)

4. Background Detection (FIG. 2 Block 2.5 and 2.6)

5. Face Detection (FIG. 2 Block 2.7)

6. Image Integration (FIG. 2 Block 2.8)

7. Video Production (FIG. 2 Block 2.9)

Stages 1 and 2 are the "Preparation Stages" for providing the user inputs, while the remaining stages 3 to 7 are the "Automatic Video Production" stages for automatically combining the input media into the final output video cartoon. The "Image Filtering" and "Background Detection" stages for each user-provided face can be done anytime before the "Image Integration" stage. For example, they can be done as and when each user-provided face is being provided. On the other hand, since the image frames of the cartoon template is in sequence, each image frame will undergo the "Automatic Video Production" stages of the invention one after another. The following sections will explain each stage of the invention.

1 Production of Cartoon Template According to Guidelines of the Invention

Figure 3:
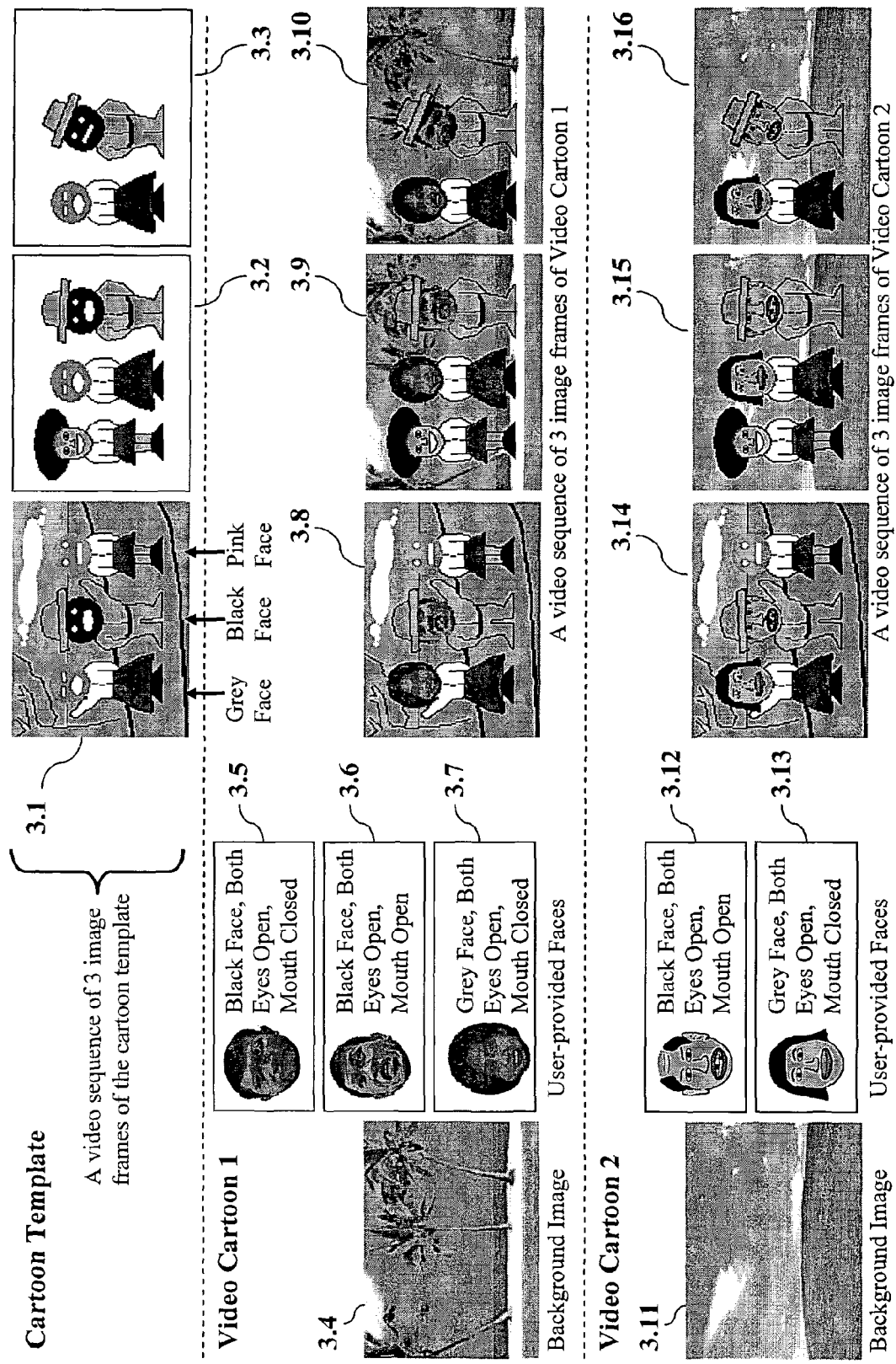
FIG. 3 shows examples of two different output video cartoons of the invention, produced by adding different user-provided faces and different background images to the same cartoon template.

This is a preparation stage for providing the cartoon template. A cartoon template is a video cartoon containing a video sequence of cartoon characters which can be distributed to many different users. With the invention, different users can add different user-provided faces, background images and audio to the same cartoon template to produce many different final video cartoons. FIG. 3 shows examples of the images frames of two different final video cartoons, "Video Cartoon 1" and "Video Cartoon 2", produced by adding different user-provided faces and different background images to the same cartoon template.

While the cartoon template can be produced by any other methods, within the cartoon template, the backgrounds and original faces of the cartoon characters must be drawn according to the guidelines of the invention. The guidelines are designed to be natural and simple to follow. Being only guidelines for drawing the backgrounds and original faces, no addition cost nor effort will be incurred when the cartoon template is being distributed to many different users. The following sub-sections explain the guidelines for the backgrounds and the original faces of the cartoon template:

1.1 Guidelines for Background

The cartoon characters in each image frame of a cartoon template may be drawn completed with a background image, as shown in FIG. 3 Item 3.1. If not, the background must be a unanimous colour covering a significant portion (example: more than 10%) of the image, as shown in FIG. 3 Item 3.2 and 3.3. Furthermore, most borders (example: more than 50%) of the image frame should be in the unanimous background colour. For FIG. 3 Item 3.1, none of its colours occupies more than 50% of its borders, therefore preventing any of its colours from being mistaken to be the background colour.

With the guidelines of the invention, the unanimously-coloured background can be accurately and efficiently detected by a background detection algorithm. The detected unanimously-coloured background may then be replaced by an optional user-provided background image during the "Image Integration" stage of the invention.

1.2 Guidelines for Original Faces of Cartoon Characters

Figure 4:
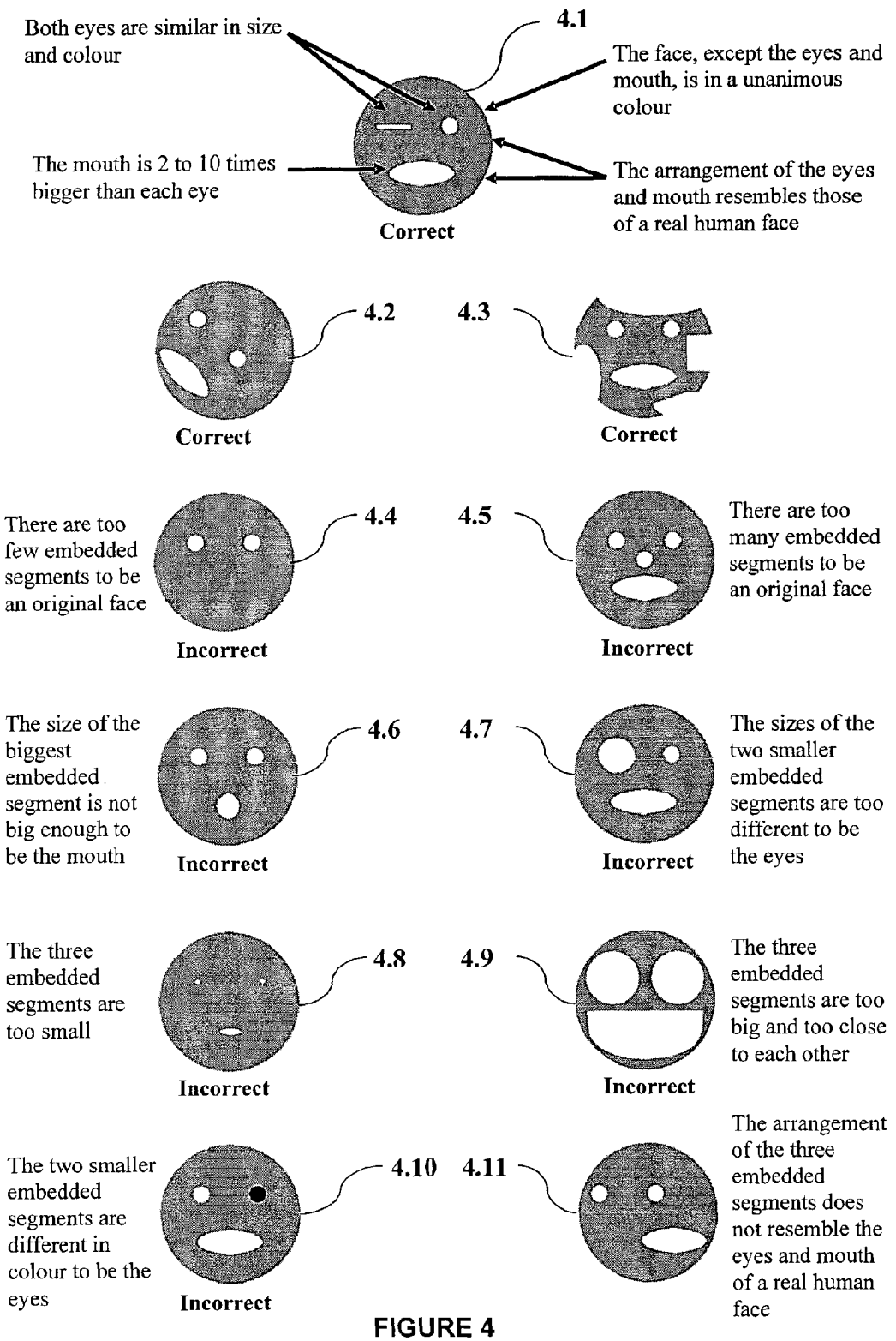
FIG. 4 shows examples of the correct and incorrect ways of drawing the original faces of the cartoon characters, according to the guidelines of the invention.

The guidelines of the invention allow the original faces, together with their facial colours, facial expressions, sizes, rotations, positions and clippings, to be accurately and efficiently detected by a face detection algorithm. The guidelines are as follows:

1. Referring to FIG. 4 Item 4.1, each original face of a cartoon character must have two eyes and one mouth, fully embedded within the face. The two eyes and the mouth are the most representative facial features, and are needed to show facial expressions. This is because the shapes and sizes of the eyes and mouth can change significantly. The other facial features, like the nose or moustache, have almost fixed shapes and sizes. With the two eyes and the mouth, there is no need for other facial features. Hence, FIG. 4 Item 4.4 and 4.5 cannot be original faces because they have either too few or too many segments embedded within them. This also means the eyes and mouth must not overlap or even touch each other.

2. Referring to FIG. 4 Item 4.1, the original face, except the eyes and mouth, must be in a unanimous colour. This unanimous colour is the facial colour of the original face.

3. Referring to FIG. 4 Item 4.1, the mouth must be significantly larger than each eye but not extremely large (example: between 2 to 10 times larger than each eye). Hence, FIG. 4 Item 4.6 cannot be an original face because there is no segment large enough to be the mouth.

4. Referring to FIG. 4 Item 4.1, the two eyes must be of the similar size (example: less than 20% difference). Hence, FIG. 4 Item 4.7 cannot be an original face because the two smallest segments do not have similar sizes.

5. Referring to FIG. 4 Item 4.1, the sizes of the two eyes and the mouth relative to the full unclipped circular size of the original face must resemble those of a real human face (example: between 2% to 40%). Hence, FIG. 4 Item 4.8 cannot be an original face because its embedded segments are too small. At the other extreme, FIG. 4 Item 4.9 also cannot be an original face because its embedded segments are too big.

6. Referring to FIG. 4 Item 4.1, the two eyes must be big enough to be visible (example: each eye should contain at least 25 pixels for a 320×240 image). If the eyes are too small, they may be mistaken as "pepper noises" and filtered off by the low-pass filter during the "Image Filtering" stage of the invention.

7. Referring to FIG. 4 Item 4.1, the shortest distance between the two eyes must be far enough to accommodate the size of another eye. Hence, for FIG. 4 Item 4.9, all the segments are also too close together to form an original face.

8. Referring to FIG. 4 Item 4.1, the two eyes of an original face must be in the same unanimous colour, but distinctively different colour from the facial colour. Hence, FIG. 4 Item 4.10 cannot be an original face because its two smaller embedded segments are in different colour.

9. Referring to FIG. 4 Item 4.1, the mouth within an original face must be in a unanimous colour, but distinctively different colour from the facial colour. To improve the accuracy of face detection, the two eyes and the mouth of the original face may be required to be the same unanimous colour. However, this is optional.

Figure 5:
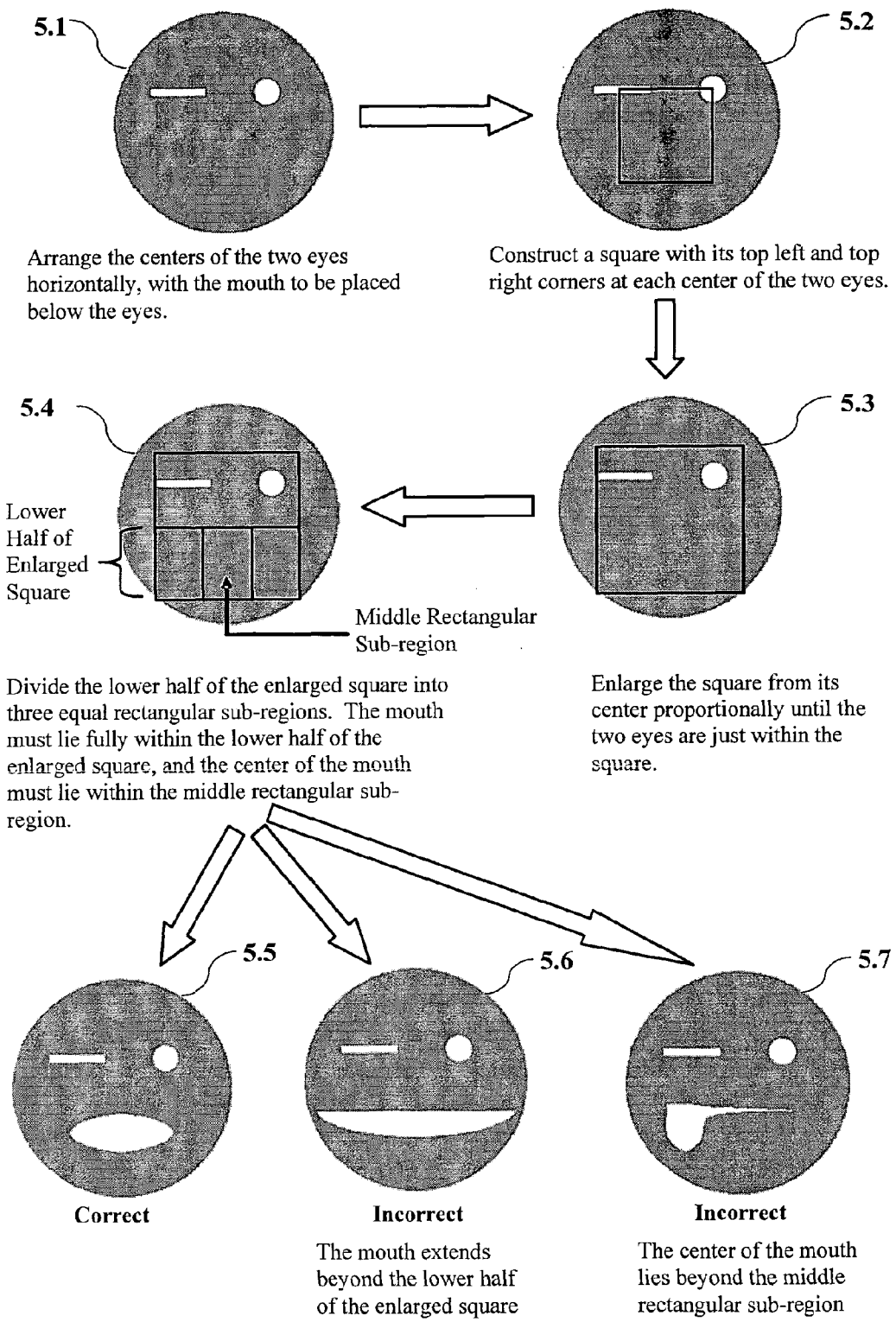
FIG. 5 shows an example of a method for arranging the eyes and mouth of an original face to resemble those of a real human face, as well as for determining if the arrangement resembles that of a real human face.

10. Referring to FIG. 4 Item 4.1, the arrangement of the eyes and mouth of an original face must resemble those of a real normal human face. Hence, FIG. 4 Item 4.11 cannot be an original face because the arrangement of its eyes and mouth does not resemble a real normal human face. The invention can use any method to check the arrangement of the eyes and mouth of an original face. FIG. 5 shows an example of such a method and is explained as follows:

10.1. First, the centers of the two eyes are arranged horizontally, with the mouth to be placed below the eyes (FIG. 5 Item 5.1). The "center" of an eye is always defined as the "center of mass" of the eye.

10.2. Second, a square is constructed with its top left and top right corners at each center of the two eyes (FIG. 5 Item 5.2).

10.3. Third, the square is enlarged from its center proportionally until the two eyes are just within the square (FIG. 5 Item 5.3).

10.4. Lastly, the lower half of the enlarged square is divided into three equal rectangular sub-regions (FIG. 5 Item 5.4). To resemble a real human face, the mouth of the original face must lie fully within the lower half of the enlarged square, and the center of the mouth must lie within the middle rectangular sub-region. Likewise, the "center" of the mouth is also always defined as the "center of mass" of the mouth.

11. The size and position of an original face are its actual size and position within the image frame.

12. The facial expression of an original face is the descriptions of the appearances and shapes of the eyes and mouth on the face. The invention can use any method to describe the facial expression. FIG. 6 shows an example of such a method, where a long rectangular eye or mouth is considered as closed, while all other shapes are considered as open. For example, for FIG. 6 Item 6.5, the facial expression is "Left Eye Open, Right Eye Closed, Mouth Closed". While it is possible to refine the facial expression further for many more different shapes, the shapes of the eyes and mouth should be drawn distinctively for the facial expression to be recognised accurately.

Figure 7:
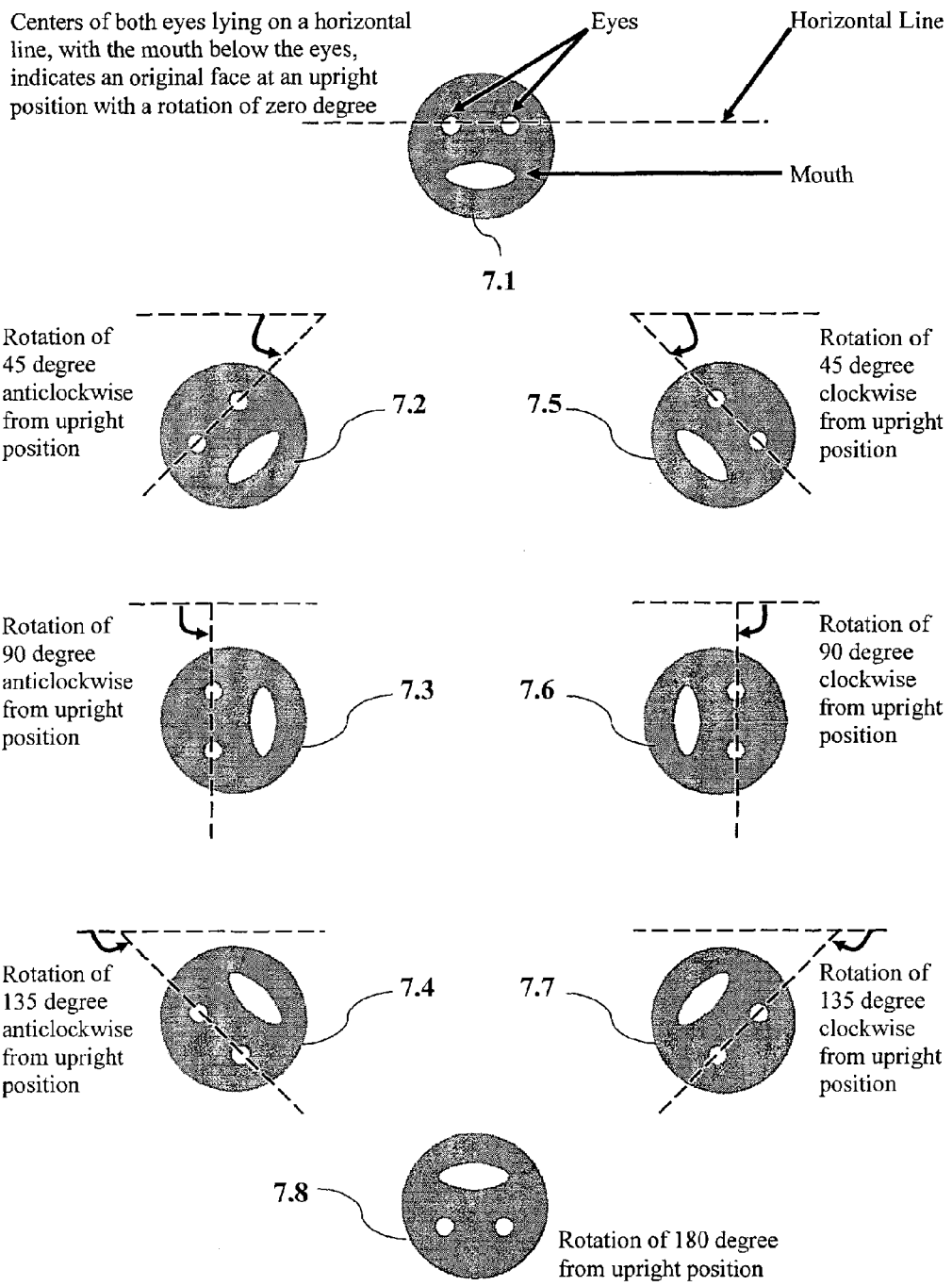
FIG. 7 shows examples of the various rotations of the original faces of the cartoon characters, drawn according to the guidelines of the invention.

13. Referring to FIG. 7, the rotation of an original face is the angle the eyes and mouth on the face have rotated together, about the center of the face, relative to the upright position. When the face is in an upright position, where the centers of the two eyes are horizontal and the mouth below the two eyes, the rotation is zero degree (FIG. 7 Item 7.1).

14. The clipping of an original face is the partial covering up of the original face by other objects in the same image frame. For example, in FIG. 3 Item 3.1, 3.2 and 3.3, the black original faces of the cartoon character with a hat are all partially clipped by the hat. If the superimposed face is not to be clipped, the original face must be fully circular. For example, in FIG. 3 Item 3.1, 3.2 and 3.3, the grey original faces of the cartoon character in long skirt are fully circular and therefore not clipped. If an original face is not fully circular but is partially covered by other objects, the superimposed face will also be clipped and partially covered by these other objects. For example, in FIG. 3 Item 3.8, 3.9, 3.10, 3.14, 3.15 and 3.16, the superimposed faces of the cartoon character with a hat are all clipped by the hat. A circular face is chosen to represent an unclipped face because a circle is easier to compute than other shape like ellipse and yet it can still look like a real human head.

15. The original face of the same cartoon character, except the eyes and mouth, must be in the same unanimous facial colour for all the image frames within the cartoon template. The original faces of different cartoon characters must be in distinctively different unanimous facial colours. This allows each cartoon character to be accurately recognised by its facial colour. FIG. 3 Item 3.1, 3.2 and 3.3 show that the cartoon character drawn with a black original face is always in trousers and with a hat, while the one drawn with a grey original face is always in long skirt.

Overall, an original face is a simplified drawing (with only eyes and mouth) of a real normal human face. Therefore, the guidelines of the invention for drawing the original face are natural and simple to follow. Referring to FIG. 4 Item 4.2, once the two eyes and the mouth of an original face are drawn correctly as a group, they can be placed any where within the original face as a group at any rotation. In fact, as an optional enhancement, the displacement of the eyes and mouth from the center of the original face (as shown in FIG. 4 Item 4.2) can be used to indicate facial orientation, for example: "face turning 45 degree left, 30 degree down". Referring to FIG. 4 Item 4.3, while the original face may also be clipped in any way, the eyes and mouth must remain fully embedded within the face.

As an example, FIG. 3 Item 3.2 shows an image frame of a cartoon template with three cartoon characters: the rightmost cartoon character with a hat and the middle cartoon character in long skirt have original faces drawn according to the guidelines of the invention, while the non-original face of the leftmost cartoon character in mini-skirt is not drawn according to the guidelines of the invention. As shown in FIG. 3, Item 3.9 and 3.15, the two original faces are being superimposed by user-provided faces, while the non-original face of the leftmost cartoon character in mini-skirt will not be superimposed.

As long as the original faces are drawn following the guidelines of the invention, they can be accurately detected and recognised by the face detection algorithm of the invention. To further improve the accuracy of detecting the correct original faces, producers of the cartoon templates also must not draw "original face-like" objects with similar colour as the actual original faces within the cartoon template. Such objects may be mistaken as the actual original faces.

2 Specification of Facial Colour and Expression for Each User-provided Face

This is a preparation stage for specifying the input user-provided faces. When a user supplies one or more user-provided faces, for each user-provided face, the user will have to specify a facial colour and a facial expression for its corresponding original face. If not, the invention will assign a default facial colour and expression. Future enhancement may even automatically detect and specify the facial expression of each user-provided face.

The specification allows the invention to select the best matching user-provided face for each detected original face of the cartoon template accurately. If an even higher accuracy is required, the colour of the eyes and mouth can also be specified, detected and matched. However, this is optional. The user-provided face is assumed to be in the conventional upright position. Hence, there is no need to specify the rotation of the user-provided face, unless it is not upright.

For each user-provided face, its facial expression for its corresponding original face is specified according to the method used to describe the facial expression of an original face. For example, if the facial expression is described according to FIG. 6, the specification could be: "Both Eyes Open, Mouth Closed", "Left Eye Open, Right Eye Closed, Mouth Open", or any other possible combinations of the eyes and the mouth, as shown in FIG. 6.

When the invention detects an original face of the cartoon template, it will also detect the facial colour and expression of the original face. According to the detected facial colour, the invention would shortlist a group of user-provided faces with the nearest user-specified facial colour. If there is more than one distinctive detected facial colour, for each distinctive detected facial colour, the user is responsible for making sure that there is at least one user-provided face with a user-specified facial colour near to that distinctive detected facial colour. For each user-provided face, the user is also responsible for specifying a facial colour near enough to the detected facial colour of its corresponding original faces.

Among the group of short-listed user-provided faces with the nearest user-specified facial colour, the invention will select the user-provided face with the best matching user-specified facial expression according to the detected facial expression. If there are two or more best matches, the invention may select any one of them. For each user-specified facial colour, the user may choose to supply any number (one or more) of user-provided faces with different user-specified facial expressions. Obviously, if there is one and only one user-provided face for a user-specified facial colour, it will always be selected when an original face with this facial colour is detected, irregardless of the facial expression.

Hence, with the user-specified facial colours and expressions, for each detected original face within an image frame of the cartoon template, the invention will be able to select the user-provided face with the best matching user-specified facial colour and expression. The selected user-provided faces will then be superimposed on the corresponding detected original faces. FIG. 3 shows examples of how the user-provided faces are selected according to the user-specified facial colours and expressions.

Referring to FIG. 3 Item 3.1, 3.2 and 3.3, the cartoon character with a grey original face and in a long skirt is detected to have facial expression of "Both Eyes Closed, Mouth Open". However, since there is only one user-provided face specified with a "Grey Face" (FIG. 3 Item 3.7) for "Video Cartoon 1", this user-provided face has to be used irregardless of the facial expression. Similarly, FIG. 3 Item 3.13 has to be used for "Video Cartoon 2".

Referring to FIG. 3 Item 3.1 and 3.2, the cartoon character with a black original face and a hat is detected to have facial expression of "Both Eyes Open, Mouth Open". Hence, its matching user-provided face is FIG. 3 Item 3.6 for "Video Cartoon 1". For FIG. 3 Item 3.3, the cartoon character with a black original face and a hat is detected to have facial expression of "Both Eyes Open, Mouth Closed". Hence, its matching user-provided face is FIG. 3 Item 3.5 instead for "Video Cartoon 1".

Referring to FIG. 3 Item 3.1, although there is a cartoon character with a pink original face and in a mini-skirt on the right, there is no user-provided face specified with a "Pink Face". Hence, the pink original face is not being superimposed by any user-provided face for both "Video Cartoon 1" and "Video Cartoon 2".

3 Image Filtering

The invention involves the detection of unanimously-coloured regions (backgrounds and original faces of cartoon characters) within images. A region within an image may look nearly unanimously-coloured to the human eye, but there may have "pepper noises" (tiny dots of another colour) and slight variations of colours, sometimes not distinguishable by the human eye. The "pepper noises" and slight variations of colours may be due to errors or noises when the image is produced, or may be due to losses when the image is encoded to and decoded from a compressed digital image or video format like JPEG (Joint Photographic Expert Group) image or MPEG (Moving Picture Expert Group) video.

The invention uses a low-pass filter to filter away the "pepper noises", followed by a colour clustering algorithm to filter away the slight variations of colours, if any, within the seemingly unanimously-coloured regions of images. The input images are the image frames of the cartoon template, and the user-provided face images. For each input image, the corresponding output is a similar filtered image with no "pepper noise" and no variation of colours within its unanimously-coloured regions. While the algorithm can modify the input image as the output image, it is preferable for the algorithm to output to a new image identical in shape and size to the input image instead. This keeps the original input image available for later usage.

While the invention can use any known low-pass filter capable of filtering away the "pepper noises", the recommended low-pass filter is the "Median Filter" which also preserves the edges well. If the input images are already guaranteed to be free of "pepper noise", low-pass filtering can be skipped. The invention can use any known colour clustering algorithm capable of filtering away the slight variation of colours within the seemingly unanimously-coloured regions of input images. Similarly, if the input images are already guaranteed to be free of slight variations of colours within their unanimously-coloured regions, colour clustering can also be skipped. An example of a colour clustering algorithm, "K-means" algorithm, which can be used by the invention, is explained as follows:

1. The input image shall be a digitized image frame of the cartoon template, or a digitized user-provided face image, which is free of "pepper noise".

2. The K-means algorithm examines the colour of every pixel within the input image.

3. Pixels of the input image with very similar colours (for example, only 5% difference in colour) are grouped together.

4. An average colour is calculated for each group of pixels with very similar colours.

5. The output image is constructed to be identical to the input image at first. However, for each pixel within the output image, its colour is changed to the average colour of its corresponding pixel at the same location within the input image. In this way, the pixels of the output image within a unanimously-coloured region will have exactly the same average colour.

Hence, after image filtering, the invention will have filtered images similar to the original images, but with no "pepper noise" and no variation of colours within the unanimously-coloured regions.

4 Background Detection

Figure 8:
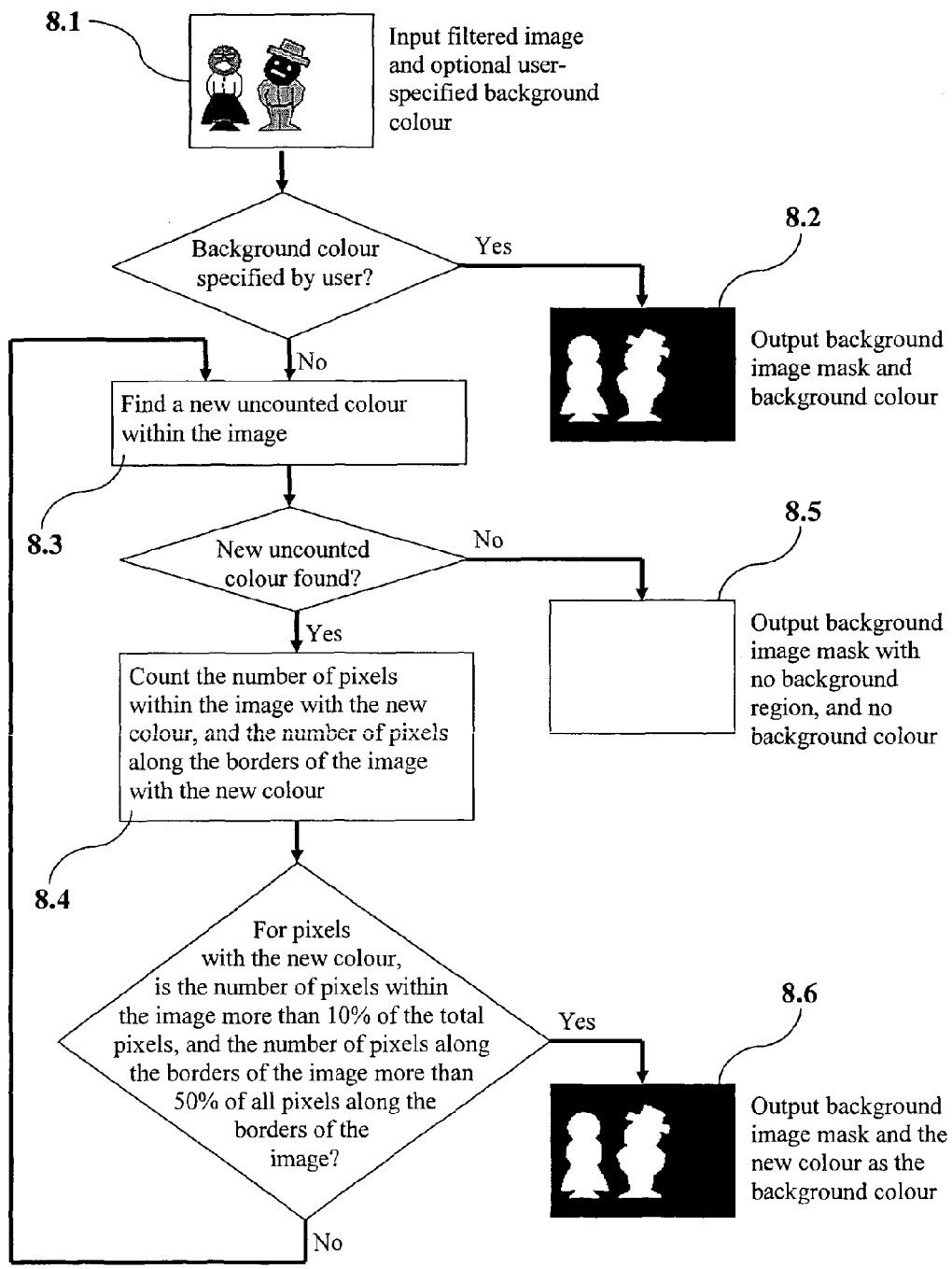
FIG. 8 shows the flow chart of an example of a background detection algorithm which can be used by the invention, together with examples of its inputs and outputs.

The invention uses a background detection algorithm to detect the unanimously-coloured backgrounds of images. The remaining region of an image not detected as background is the detected foreground. FIG. 8 shows the inputs (FIG. 8 Item 8.1) and the corresponding outputs (FIG. 8 Item 8.2, 8.5 or 8.6) of the background detection algorithm required by the invention. The input image may be a filtered image frame of the cartoon template (for FIG. 2 Block 2.5), or a filtered user-provided face image (for FIG. 2 Block 2.6). For image frames of the cartoon template, the user may have specified a background colour. Referring to FIG. 8, for each input image, the corresponding outputs are its background colour, if any, and a new background image mask with only two regions: the background region, and the foreground region. The original input image is kept unmodified for later usage.

The invention can use any existing and known background detection algorithm to detect the unanimously-coloured background of an image, drawn according to the guidelines of the invention. FIG. 8 shows the flow chart of an example of a background detection algorithm which can be used by the invention. The flow chart is explained as follows:

1. The background detection algorithm starts with a filtered digitalized image frame of the cartoon template, or a filtered digitalized user-provided face image, which is the output of the preceding "Image Filtering" stage (FIG. 8 Item 8.1).

2. If the user has specified a background colour, whatever regions within the image and along the border of the image with the user-specified background colour are classified as the background (FIG. 8 Item 8.2).

3. If the user has not specified a background colour, the background detection algorithm will search for a new colour within the image which has not been counted yet (FIG. 8 Item 8.3).

4. For each new uncounted colour found, the background detection algorithm will count the number of pixels within the image with this new uncounted colour. The background detection algorithm will also count the number of pixels along the borders of the image with the new uncounted colour (Fig. E 8 Item 8.4).

5. If the number of pixels within the image with the new uncounted colour is substantial (example: more than 10% of the total pixels within the image have the colour), the new uncounted colour is considered and found to be a unanimous colour. If not, the new uncounted colour is now considered to be "counted" and disregarded.

6. For each unanimous colour found, if most pixels (example: more than 50% of the pixels) along the borders of the image have the unanimous colour, the unanimous colour is considered and found to be the background colour. If not, the unanimous colour is now considered to be "counted" and disregarded.

7. The regions within the image with the background colour are classified as the detected background. The remaining regions of the image not detect as background are classified as the detected foreground.

8. If after all colours are counted and there is still no background colour, the image is considered to have no background region. That is, the whole image is the foreground region (FIG. 8 Item 8.5).

9. Referring to FIG. 8 Item 8.2 and 8.6, once the background has been detected, the background detection algorithm will construct a new digitalized output background image mask with the same shape and size as the input image. Pixels within the background image mask can take only two values: one to indicate background, another to indicate foreground. Pixels where the corresponding locations in the input image are within the detected background will have the background value (FIG. 8 Item 8.2 and 8.6 black regions), while pixels where the corresponding locations in the input image are not within the detected background will have the foreground value (FIG. 8 Item 8.2 and 8.6 white regions).

For each image frame of a cartoon template, the detected foreground contains the cartoon characters and their original faces, if any. For each user-provided face image, the detected foreground is the user-provided face, while the detected background is to be clipped away.

5 Face Detection

Figure 9:
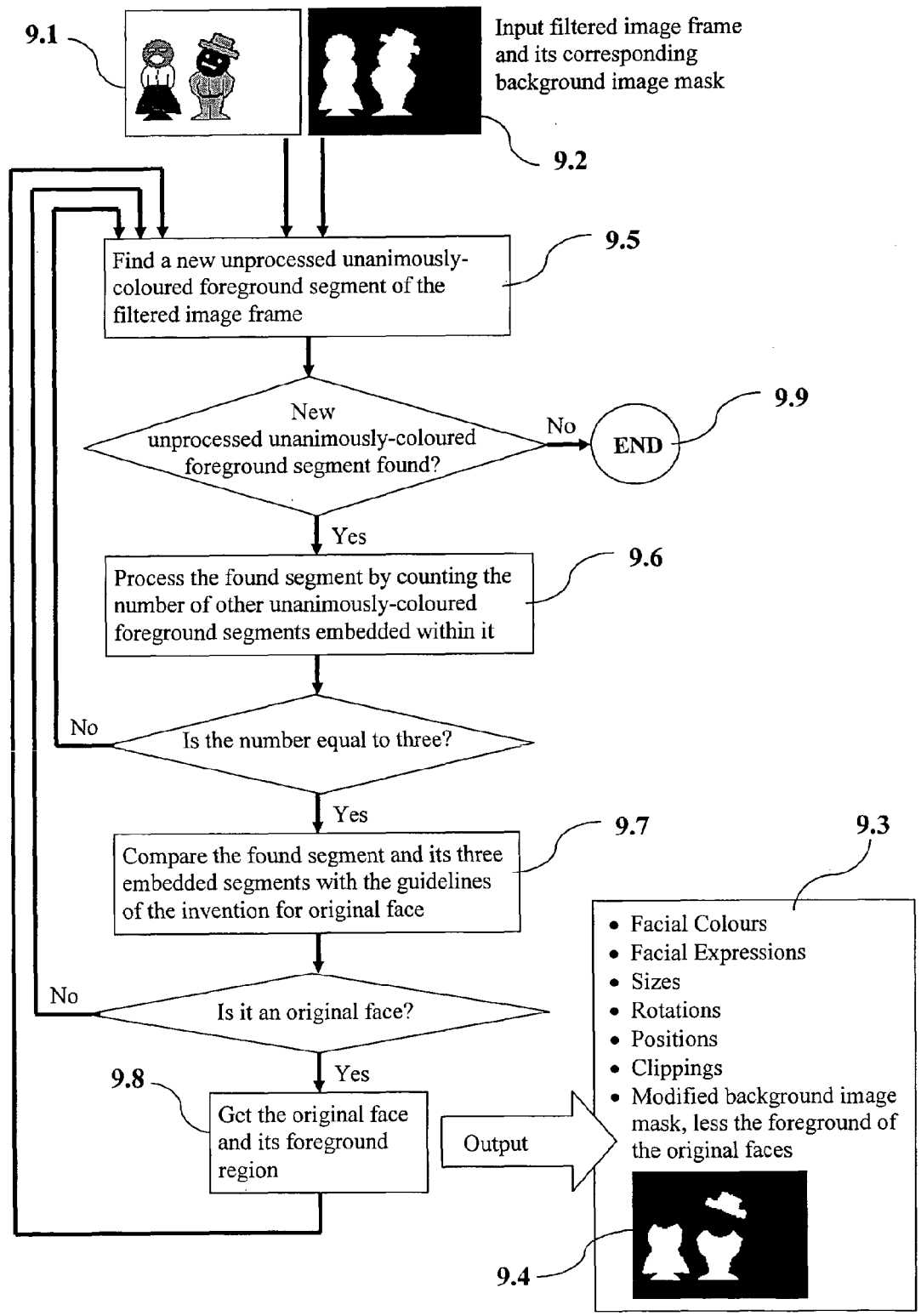
FIG. 9 shows the flowchart of an accurate, fast and yet simple face detection algorithm specially-designed to detect the original faces within an image frame of a cartoon template, together with examples of its inputs and outputs.

The invention uses a face detection algorithm to detect the cartoon characters' original faces (within the image frames of a cartoon template). FIG. 9 shows the inputs and outputs of the face detection algorithm required by the invention. The inputs are a filtered digitalized image frame (FIG. 9 Item 9.1) of the cartoon template and its corresponding background image mask (FIG. 9 Item 9.2). Referring to FIG. 9 Item 9.3, the outputs are the facial colours, facial expressions, sizes, rotations, positions and clippings of the detected original faces. Referring to FIG. 9 Item 9.4, during face detection, the input background image mask is also being modified by the removal of the detected original faces' foreground regions (and therefore the addition of the detected original faces' regions to the background).

The invention can use any existing and known face detection algorithm to detect the cartoon characters' original faces. However, since the original faces are drawn according to the guidelines of the invention and followed a specific pattern, the face detection algorithm can be simplified to a pattern recognition algorithm which is significantly more accurate, faster and yet simpler than a general face detection algorithm. Hence, the invention uses a specially-designed pattern recognition algorithm as the face detection algorithm to detect the original faces.

FIG. 9 shows the flow chart of an example of a very accurate, fast and yet simple pattern recognition algorithm which can be used by the invention as the face detection algorithm. The flow chart is explained as follows:

1. Referring to FIG. 9 Item 9.1 and 9.2, the face detection algorithm starts with a filtered digitalized image frame of the cartoon template and its corresponding background image mask.

2. Referring to FIG. 9 Item 9.5, the face detection algorithm will search for a new unprocessed unanimously-coloured foreground segment within the foreground regions of the image frame (as indicated by the foreground pixels of the background image mask). A unanimously-coloured foreground segment is a group of neighbouring and connected pixels with the same colour within the image. Such segment may be found by "flood-filling" each pixel which has not been "flood-filled" yet. During "flood-filling", all neighbouring and connected pixels (and their neighbouring and connected pixels in turns, and so on) with the same colour are grouped together into a segment.

3. The found unanimously-coloured foreground segment, if any, is now considered to be "processed".

4. Referring to FIG. 9 Item 9.6, for each unanimously-coloured foreground segment found, the face detection algorithm will count the number of other unanimously-coloured foreground segments embedded within it. If the number is not three, the unanimously-coloured foreground segment is not considered to be an original face and is disregarded.

5. Referring to FIG. 9 Item 9.7, if the number is three, the face detection algorithm will compare the found segment and its three embedded segments with the guidelines of the invention for original face. If the found segment and its three embedded segments do not satisfied the guidelines of the invention for original face, the found segment is not considered to be an original face and is disregarded.

6. Referring to FIG. 9 Item 9.8, if the found segment and its three embedded segments satisfied the guidelines of the invention for original face, the found segment is confirmed to be an original face. The face detection algorithm can then proceed to produce the required outputs as illustrated in FIG. 9 Item 9.3.

7. For each confirmed original face, the face detection algorithm will assume that the significantly bigger unanimously-coloured segment embedded within the confirmed original face is the mouth, while the other two smaller unanimously-coloured segments embedded within the confirmed original face are the eyes. The unanimously-coloured foreground segment embedding the eyes and mouth is the confirmed original face itself.

8. For each confirmed original face, its facial colour is the colour of the unanimously-coloured foreground segment associated with it, excluding the eyes and mouth.

9. For each confirmed original face, the face detection algorithm will check the shapes of the eyes and mouth. If an eye or the mouth appears rectangular and long, the eye or mouth is detected to be "closed". If not, the eye or mouth is detected to be "open". These descriptions form the detected facial expression of the confirmed original face.

10. For each confirmed original face, the face detection algorithm will calculate the smallest horizontal bounding rectangle for the face. The size of the horizontal bounding rectangle is defined by its width and height, while the position of the horizontal bounding rectangle is its center. The size and position of the bounding rectangle are taken to be the size and position of the confirmed original face.

11. For each confirmed original face, the face detection algorithm will calculate the angle of rotation of the face from the upright position, as illustrated in FIG. 7. This angle is the rotation of the confirmed original face.

12. For each confirmed original face, the face detection algorithm will calculate the size of the biggest possible full circle within the smallest bounding rectangle of the confirmed original face. The face detection algorithm will then compare the shapes and sizes of the confirmed original face and the full circle. If the shapes and sizes are significantly different (example: different by more than 10%), the confirmed original face is detected to be clipped by other objects. If not, the confirmed original face is detected to have no clipping.

13. Finally for each confirmed original face, all its corresponding foreground pixels in the input background image mask are converted to background pixels, thereby removing it from the foreground.

14. Referring to FIG. 9 Item 9.5, after processing a found segment or detecting an original face, the face detection algorithm will continue to search for and process the next new unprocessed unanimously-coloured foreground segment of the filtered image frame. The process is repeated until there is no more new unprocessed unanimously-coloured foreground segment. The face detection algorithm will then end (FIG. 9 Item 9.9).

6 Image Integration

Figure 10:
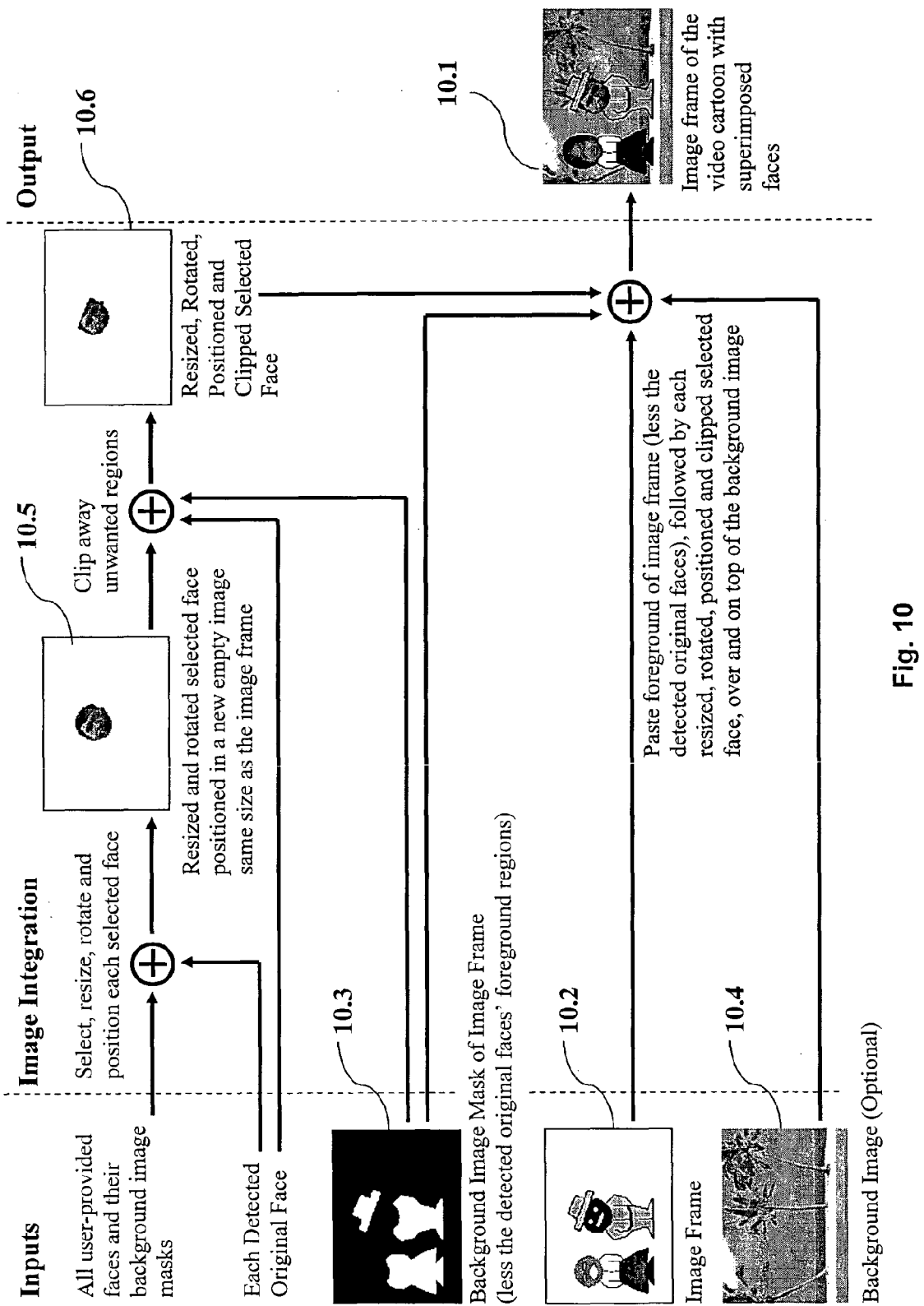
FIG. 10 shows the data flow diagram of the "Image Integration" stage of the invention, for combining an image frame of the cartoon template, user-provided faces and a user-provided background image into an image frame of the final output video cartoon.

During the "Image Integration" stage, the invention automatically combines an image frame of the cartoon template with an optional background image and one or more optional user-provided faces into an image frame of the final video cartoon. FIG. 10 shows the inputs and output of the "Image Integration" stage. The output is an image frame of the final video cartoon (FIG. 10 Item 10.1) while the inputs are listed as follows:

1. An image frame of the cartoon template (FIG. 10 Item 10.2) and its corresponding background colour, if any.

2. The corresponding background image mask of the image frame, as modified by the face detection algorithm, without the detected original faces' foreground regions (FIG. 10 Item 10.3).

3. An optional background image (FIG. 10 Item 10.4).

4. Optional user-provided faces and their corresponding background image masks as detected by the background detection algorithm.

5. Detected original faces of the image frame of the cartoon template, if any. Each detected original face consists of its facial colour, facial expression, size, rotation, position and clipping, as detected by the face detection algorithm of the invention.

FIG. 10 shows the data flow diagram of the "Image Integration" stage. The data flow diagram is explained as follows:

1. A new image frame for the final video cartoon is first constructed.

2. If the user has provided at least a background image (FIG. 10 Item 10.4), one of the background images (selected by any possible methods, examples: in random or in sequence) is resized to fit and fill the new image frame.

3. If there is no background image, the new image frame is set to a user-specified background colour, if any.

4. If there is no user-specified background colour, but there is a detected background colour for the image frame of the cartoon template, the new image frame is set to the detected background colour.

5. The detected foreground of the image frame of the cartoon template (as indicated by the foreground pixels within the corresponding background image mask), less the detected original faces, is then pasted onto the new image frame, over and on top of the background colour or image. Edge smoothing may optionally be done along the edges of the detected foreground so that it blends well with the background.

6. Referring to the section "Specification of Facial Colour and Expression for Each User-provided Face" of this document, for each detected original face, the invention selects the user-provided face with the best matching user-specified facial colour and expression, from among all the available user-provided faces.

7. Each selected user-provided face, if any, is then resized and rotated according to the size and rotation of the detected original face. Any detected background region of the resized and rotated user-provided face is clipped away. Any extra background region introduced when the image is rotated is also clipped away.

8. Each resized and rotated selected face is then positioned at its corresponding detected original face's position in a new empty image same size as the image frame (FIG. 10 Item 10.5).

9. If there is any clipping of each detected original face by other objects in the foreground of the image frame, each resized, rotated and positioned selected face will be clipped correspondingly as well. The clipping is done by removing any overlapping regions of each resized, rotated and positioned selected face, and the foreground of the background image mask (FIG. 10 Item 10.3).

10. Each resized, rotated, positioned and clipped selected face (FIG. 10 Item 10.6), if any, is then pasted onto the new image frame, at the corresponding position of its detected original face, over and on top of the background and pasted detected foreground. Again, edge smoothing may optionally be done along the edges of each pasted face so that it blends well with the background and pasted detected foreground.

In this manner, each new image frame of the final video cartoon has similar foreground with the corresponding image of the cartoon template, but may have an additional user-provided background image and one or more user-provided faces superimposed over the original faces of the cartoon template (FIG. 10 Item 10.1).

FIG. 3 shows two examples of the three corresponding output image frames of the "Image Integration" stage (FIG. 3 Item 3.8, 3.9, 3.10 and Item 3.14, 3.15, 3.16), for inputs consisting of a video sequence of three image frames of a cartoon template (FIG. 3 Item 3.1, 3.2, 3.3), a background image and two or more user-provided faces.

7 Video Production

Referring to FIG. 3, each image frame output from the "Image Integration" stage is assembled in their original video sequence to produce the final video cartoon. The sequence order of the image frames of the final video cartoon is therefore the same as that of the original cartoon template. Optional audio may be added to the final video cartoon in the process.

Starting from a distributable cartoon template, the final output of the invention is a video cartoon with user-provided superimposed faces and backgrounds.

What is claimed is:

1. A method of producing a desired digital image of at least one desired face by a computer comprising:
    providing to the computer a digital image of at least one original face, wherein an original face comprises a foreground region drawn according to a set of guidelines;
    providing at least one face image from external sources;
    for the original face within the digital image, selecting a corresponding face image (selected corresponding face image) from among the face images from external sources;
    for the original face within the digital image, modifying the selected corresponding face image (modified corresponding face image); and
    replacing the original face within the digital image with the selected and modified corresponding face image at a desired position and a desired size within the digital image to produce the desired digital image of the desired face,
    wherein the set of guidelines comprises
    defining the original face as the foreground region drawn within the digital image to resemble and represent the desired face,
    defining the original face as the foreground region surrounded by other (foreground and/or background) regions and/or edges within the digital image,
    defining the original face as the foreground region with a distinctive edge wherein the distinctive edge separates the original face from the other regions within the digital image,
    defining a position of the original face drawn within the digital image as the desired position of the desired face,
    defining a size of the original face drawn within the digital image as the desired size of the desired face,
    defining the original face as the foreground region with majority of an area in a unanimous colour,
    defining the original face as the foreground region containing facial features, wherein the facial features and the foreground region of the original face are separated by different colours or edges,
    defining the facial features as comprising two eyes and one mouth,
    defining the two eyes as similar in size to each other,
    defining each of the two eyes to be in a unanimous colour,
    defining the mouth as bigger in size than each of the two eyes,
    defining the mouth to be in a unanimous colour,
    defining an arrangement of the two eyes and the mouth within the original face, as similar to an arrangement of eyes and mouth of a real human face,
    defining the sizes of the two eyes and the mouth relative to corresponding sizes of the original face, as similar to sizes of the eyes and the mouth of a real human face relative to the corresponding sizes of the real human face, and
    defining an upright position of the original face as a position where the two eyes are lying horizontally, with the mouth lying below the two eyes.

2. A method for image processing by a computer comprising:
    providing to the computer a digital image of at least one original face, wherein an original face comprises a foreground region drawn according to a set of guidelines;
    processing the digital image to recognize the original face (recognized original face) within the digital image, according to the set of guidelines; and
    processing the recognized original face to obtain a corresponding digital representation defining a desired face according to the set of guidelines, wherein the set of guidelines at least comprises
defining the original face as the foreground region containing facial features, wherein the facial features and the foreground region of the original face are separated by different colours or edges,
defining the facial features as comprising two eyes and one mouth,
defining the two eyes as similar in size to each other,
defining each of the two eyes to be in a unanimous colour,
defining the mouth as bigger in size than each of the two eyes,
defining the mouth to be in a unanimous colour,
defining an arrangement of the two eyes and the mouth within the original face, as similar to an arrangement of eyes and mouth of a real human face,
defining the sizes of the two eyes and the mouth relative to corresponding sizes of the original face, as similar to sizes of the eyes and the mouth of a real human face relative to the corresponding sizes of the real human face, and
defining an upright position of the original face as a position where the two eyes are lying horizontally, with the mouth lying below the two eyes.

3. The method of claim 1, wherein the digital image comprises at least one of the original face and other foreground and/or background regions.

4. The method of claim 3, wherein the background of the digital image is a redundant region replaceable by a corresponding region of another image.

5. The method of claim 2, wherein the corresponding digital representation comprises:
   a position of the original face within the digital image; and
   a size of the original face within the digital image.

6. The method of claim 5, wherein the corresponding digital representation further comprises:
   a facial colour of the original face within the digital image;
   a facial expression of the original face within the digital image;
   a rotation of the original face within the digital image; and
   a clipping of the original face within the digital image.

7. The method of claim 1, wherein a face image from the external sources comprises:
   a digital image with a single desired face as a foreground; and
   a background, wherein the background is a redundant region to be clipped away and discarded.

8. The method of claim 7, wherein the face image from the external sources further comprises:
   a facial colour; and
   a facial expression.

9. The method of claim 1, wherein the selected corresponding face image comprises:
   a face image with the nearest facial colour to facial colour of the original face; and
   a face image with the best matching facial expression to facial expression of the original face.

10. The method of claim 1, wherein the modified corresponding face image comprises acts of:
    being digitally resized, dependence upon a digital representation defining the original face;
    being digitally rotated, dependence upon rotation of the original face; and
    being digitally clipped, dependence upon clipping of the original face and redundant background of the modified corresponding face image.

11. The method of claim 1, wherein the replacement of the original face comprises:
    replacing the original face with a surrounding background colour or a corresponding region from an available user-provided background image; and
    superimposing the selected and modified corresponding face image onto the digital image, at a position dependence upon a digital representation defining the original face.

12. The method of claim 1, wherein the set of guidelines further comprises:
    defining a facial colour of the original face as dependence upon at least one colour of the original face;
    defining the original face with the facial colour as belonging to a same subject; and
    defining the original face with a different facial colour as belonging to a different subject.

13. The method of claim 1, wherein the set of guidelines further comprises:
    defining an original shape for the original face; and
    defining clipping of the original shape (of the original face) as representing a corresponding clipping of the original face.

14. The method of claim 1, wherein the set of guidelines further comprises:
    defining an upright position of the original face as dependence upon an orientation of a shape of the original face within the digital image; and
    defining a rotation of the original face as an angular difference between the original face and the upright position of the original face.

15. The method of claim 14, wherein the upright position of the original face is defined as dependence upon an arrangement of facial features within the original face.

16. The method of claim 1, wherein different shapes, or different colours, or different shapes and colours of facial features within the original face are defined to represent different facial expressions of the original face.

17. A method for producing an output video containing a sequence of a desired digital image of at least one desired face by a computer comprising:
    providing to the computer an input video containing a sequence of an original digital image of at least one original face, wherein an original face comprises a foreground region drawn according to a set of guidelines;
    providing at least one face image; and
    replacing the original face within the input video by superimposing a corresponding input image of the desired face, if available, onto the original face to produce the output video, wherein the set of guidelines comprises defining the original face as the foreground region drawn within the digital image to resemble and represent the desired face, defining the original face as the foreground region surrounded by other (foreground and/or background) regions and/or edges within the digital image, defining the original face as the foreground region with a distinctive edge wherein the distinctive edge separates the original face from the other regions within the digital image, defining a position of the original face drawn within the digital image as the desired position of the desired face, defining a size of the original face drawn within the digital image as the desired size of the desired face, the foreground region with majority of an area in a unanimous colour, the foreground region containing facial features, wherein the facial features and the foreground region of the original face are separated by different colours or edges, defining the facial features as comprising two eyes and one mouth, defining the two eyes as less than 20% difference in size to each other, defining each of the two eyes to be in a unanimous colour, defining the mouth as bigger in size than each of the two eyes, defining the mouth to be in a unanimous colour, defining an arrangement of the two eyes and the mouth within the original face, as similar to an arrangement of eyes and mouth of a real human face, defining the sizes of the two eyes and the mouth relative to corresponding sizes of the original face, as 2% to 40% difference from sizes of the eyes and the mouth of a real human face relative to the corresponding sizes of the real human face, and defining an upright position of the original face as a position where the two eyes are lying horizontally, with the mouth lying below the two eyes.

* * * * *